March 20, 1934. C. R. O. LAWES 1,951,484
LIQUID FILTER
Filed Jan. 4, 1932
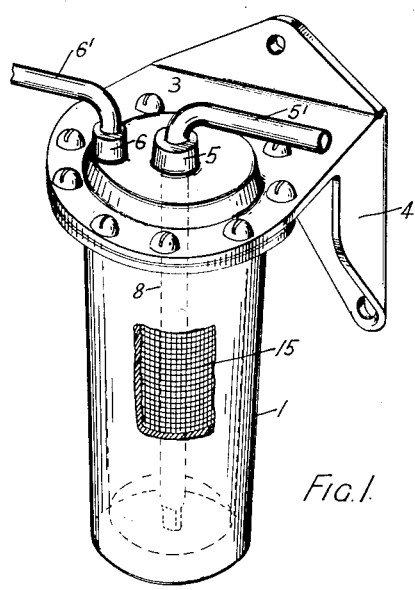
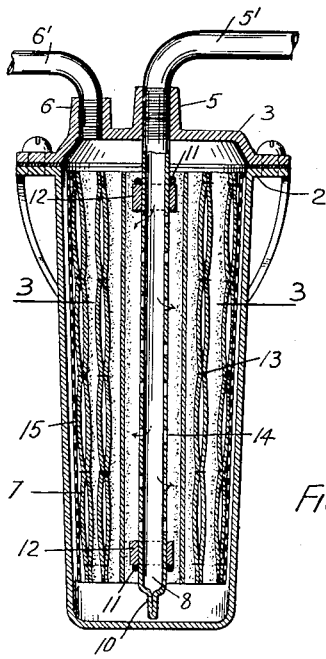
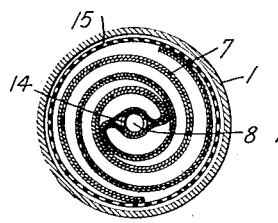
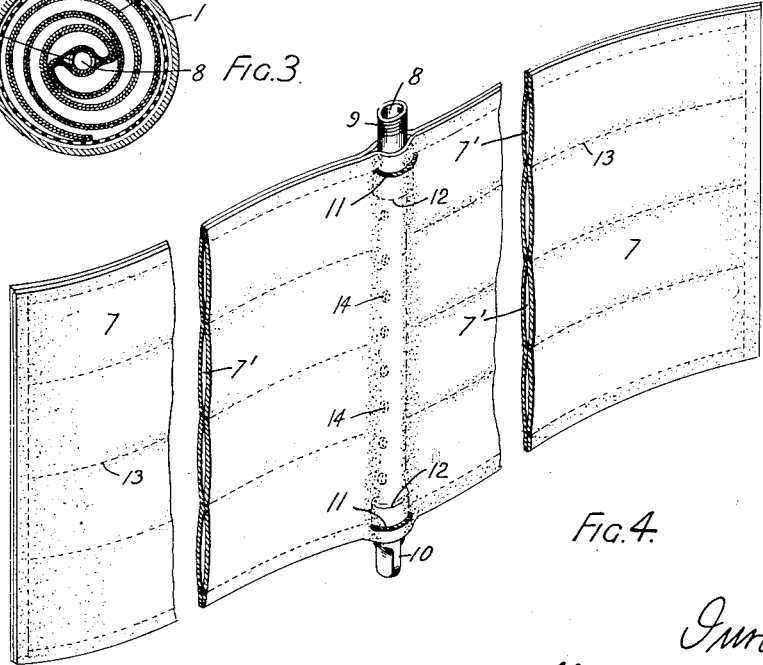
Inventor
Clifford Rupert Oliver Lawes
By Bilinger, Atty.

Patented Mar. 20, 1934

1,951,484

UNITED STATES PATENT OFFICE 1,951,484

LIQUID FILTER

Clifford Rupert Oliver Lawes, Woollahra, near Sydney, New South Wales, Australia Application January 4, 1932, Serial No. 584,714
In Australia November 27, 1931

2 Claims. (Cl. 210—164)

The invention relates to filters for liquids, and it has particular reference to an oil filter utilized for cleansing the lubricating oil of a motor vehicle engine whilst the latter is running. The filter is not, however, limited to this application, as it can readily be utilized for cleansing other oils, or even other liquids.

In connection with oil filters for motor vehicle engines it is known to utilize as a filtering medium, a closed bag through which the oil to be filtered is passed. Such bag filters as are already used or proposed, however, have certain constructional defects which mitigate against the realization of the desired filtering efficiency and longevity of the filtering medium. Moreover, owing to the construction, the replacement of a used filter bag is expensive.

In the case of the present invention, no claim is made to the general principle of a bag filter, but the invention resides in the constructional features of the filter which constitute such a progressive step as to produce a filter which is more efficient in operation, more durable, and is more easily and cheaply replaced when the filtering medium is no longer effective, than is the case with filters previously known.

The increase in filtering efficiency is achieved by distributing the oil evenly over the whole interior surface of the filter bag. This eliminates localized pressure within the bag, which pressure results in a heavy coating of the foreign matter, separated from the oil, on certain sections of the bag, choking these sections. With the present construction, however, the foreign matter is spread relatively evenly over the whole interior surface of the bag, with a resultant high filtering efficiency.

The present filter is characterized in that the filter bag is releasably attached to the feed orifice of the casing, so that when the useful life of the bag has expired, the latter may be readily renewed without a replacement of any other parts.

A preferred embodiment of the invention is illustrated in the accompanying drawing, in which Fig. 1 is a perspective view of the assembled filter, with portion of the case broken away to shew the interior construction.

Fig. 2 is a longitudinal cross-sectional elevation of the filter,

Fig. 3 is a cross-sectional view on the line 3—3 of Fig. 2, and

Fig. 4 is a broken perspective view of the bag of the filter and the feed nipple therefor.

The filter comprises a cylindrical case 1 closed at the base and having at its upper end a flange 2 bolted to a cover plate 3 which forms a closed casing for the filter. The cover plate is formed with a bracket 4 for attachment to a suitable part of a motor vehicle. The cover 3 has a screwed inlet aperture 5 to which a bye-pass line $5^1$ from the oil pump of the engine is connected, and also a screwed outlet aperture 6 to which is attached a return line $6^1$ for the filtered oil to the engine sump, or other point of disposal.

As shewn in Fig. 4, the closed filter bag 7 is of flat rectangular shape, and transversely through the centre of the bag is passed the feed nipple 8. In the disposition shewn, the upper end of the feed nipple 8 is threaded as at 9, whilst the lower end 10 is closed. The feed nipple 8 is sealed in the bag by loops 11, 11, passing through the bag and around the nipple on the outside of locating ferrules 12, 12. The bag is divided (except around the feed nipple) into longitudinal sections $7^1$, $7^1$ by rows of stitching 13, 13. The nipple 8 is liberally apertured, as at 14, 14, within the bag, so that oil passing through the nipple is fed evenly into all the sections $7^1$ of the bag and is spread uniformly over the surface of the latter, thus eliminating localized pressure and causing a relatively even distribution of foreign matter over the filtering surface. Such a construction is conducive to the most efficient filtering of the oil, and a maximum life of the bag 7.

The bag may be of any suitable filtering material, such as "swansdown", with the furred side within the bag.

When the filter is assembled, the threaded end 9 of the nipple 8 is screwed into the feed aperture 5, and the bag 7 is thus connected to the oil supply through lead $5^1$. The bag 7 is loosely coiled around the feed nipple 8 as shewn in Figs. 2 and 3, and is retained in this disposition by a light mesh cylinder 15.

In use, oil passes through feed aperture 5, down feed nipple 8, through apertures 14, 14 therein, into the bag and over the interior surface of the same, through which it is filtered, into the case 1 and out through the return aperture 6 and by lead $6^1$ to the engine sump or other place of disposal.

When the filter has been in use for a reasonable mileage, the case 1 is removed from the cover plate 3, and the bag 7 removed from the feed aperture 5 by unscrewing the feed nipple 8. A new bag (with its feed nipple) is very readily installed by simply screwing the nipple into the feed aperture 5.

The cost of renewal of the filter is therefore only the cost of the bag and nipple, as opposed to the cost of a complete case and bag as is at present necessary with other types of bag filters.

Moreover, owing to the construction of the bag, the filtering of the oil is more efficiently carried out and the life of the bag is extended.

What I claim and desire to secure by Letters Patent is:—

1. A filter comprising a tubular hollow body closed at one end and at the other fitted with a detachable cover provided with a centrally located inlet passage and an outlet passage, a perforated tubular feed nipple releasably connected at one end to said inlet passage, extending into the body and closed at its other end, on said nipple two ferrules located respectively near its ends, a closed filter bag of substantialy rectangular shape across one dimension of which said feed nipple extends laterally, and means securing and sealing the bag on the nipple, said means comprising loops passing through the material of the bag and around the ferrules.

2. A filter according to claim 1 in which the bag is divided into sections each fed directly from the perforations in the feed nipple, is spirally wound about the nipple and is encompassed by a retaining cylinder of metal gauze.

CLIFFORD RUPERT OLIVER LAWES.